(No Model.)

D. HIGHAM.
REGULATION OF ELECTRIC MOTORS.

No. 377,255. Patented Jan. 31, 1888.

Witnesses:
Inventor:
Daniel Higham
by his Attorneys

United States Patent Office.

DANIEL HIGHAM, OF PHILADELPHIA, PENNSYLVANIA, ASSIGNOR TO THE HIGHAM ELECTRIC MOTOR COMPANY, OF SAME PLACE.

REGULATION OF ELECTRIC MOTORS.

SPECIFICATION forming part of Letters Patent No. 377,255, dated January 31, 1888.

Application filed February 21, 1887. Serial No. 228,340. (No model.)

*To all whom it may concern:*

Be it known that I, DANIEL HIGHAM, a citizen of the United States, and a resident of Philadelphia, Pennsylvania, have invented certain Improvements in the Regulation of Electric Motors, of which the following is a specification.

The object of my invention is to provide means whereby the speed of electric motors—such as are supplied from constant-current circuits—can be automatically governed or regulated in a simple and efficient manner.

Figure 1:
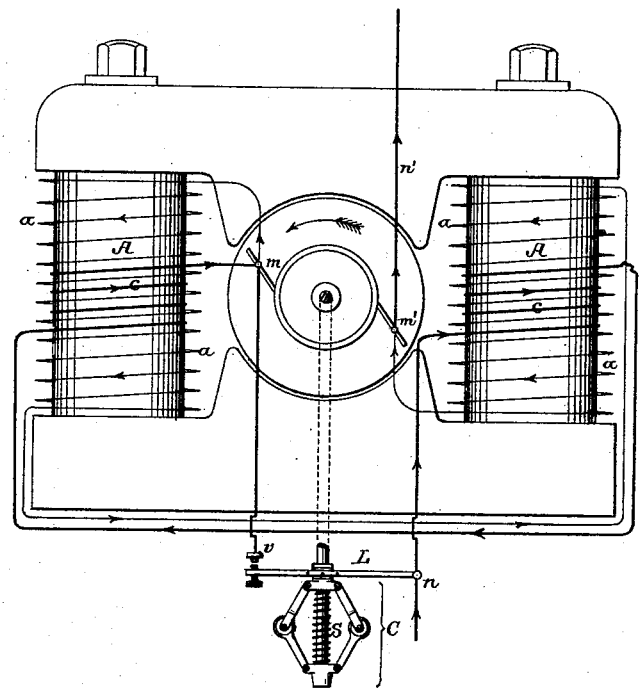
Figure 2:
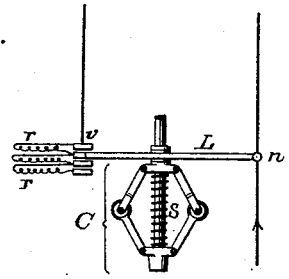

In the accompanying drawings, Figure 1 is a diagram illustrating my invention, and Fig. 2 is a diagram illustrating a modification.

A is a field-magnet of an electric motor, on the cores of which are wound two sets of coils, one opposing the attractive energy of the other. The coils $a\ a$, which are the main energizing-coils, are in shunt-circuit from the terminals or brushes $m\ m'$ of the armature, while the opposing coils $c\ c$, which are the regulating-coils, are connected in series. With these coils I combine a speed-governor device, which is controlled by the speed of the armature to automatically vary the magnetic effect of the opposing series coils or a part of them, and thereby regulate the motor. This varying of the magnetic action of these coils may be accomplished by different means.

In the diagram, Fig. 1, I have illustrated an arrangement by which this is accomplished by the making and breaking of a short circuit around the opposing coils.

C is a centrifugal device driven by or mounted on the armature-shaft, as indicated by dotted lines. A contact, $v$, is connected to the brush $m$ of the armature, and a contact-arm, L, which is controlled by the centrifugal device C, is connected to the terminal or lead $n$. The other lead, $n'$, is connected to the brush $m'$ of the armature. When the motor is below the predetermined or desired speed, the contact-arm L will be pressed against the contact $v$ by the spring S of the centrifugal governor, thereby connecting the lead $n$ directly to the brush $m$, and consequently establishing a short circuit around the coils $c\ c$, or, in other words, cutting them out of circuit. On the other hand, when the motor rises above the desired speed, the centrifugal force of the device C will compress the spring S and break the contact at $v$. As the lead $n$ is connected to the brush $m$ through the coils $c\ c$, the said coils $c\ c$ will thus be thrown into the circuit again.

Before describing the operation of this regulation it will be well to state that the resistance of the shunt circuit or coils $a\ a$ should be such that any current traversing the shunt-coils $a\ a$ shall be capable of setting up, along with the current of the armature-coils, a magnetic field which will produce sufficient counter electro-motive force to cause the potential at the terminals of the armature (when it is running at the desired speed and no current is traversing the coils $c\ c$) to be more than sufficient, or at least sufficient, to sustain the maximum current of the shunt-coils against the resistance of the shunt circuit. The number of ampère-turns in the regulating-coils $c\ c$ (when fully excited) should be such as to so reduce the magnetic field that the current of the coils $a\ a$ and the current of the armature could not produce sufficient potential at the terminals of the armature to sustain the minimum current of the shunt-coils $a\ a$.

The operation of this regulation is then as follows: When current is switched into the motor, rotary motion is imparted to the armature and the speed increases until it reaches the desired rate. The speed is then prevented from further increasing by the controlling device C, which reduces the attractive energy of the field-magnet by throwing the opposing coils $c\ c$ into circuit. This would reduce the speed below the desired rate; but it is prevented by the controlling device C, which increases the attractive energy of the field-magnet by establishing the short-circuiting around, or, in other words, cutting out, the opposing coils $c\ c$. By this means the speed is prevented from increasing above or decreasing below the desired rate. In order that this regulation may not be spasmodic in its action, the controlling device C should be of the most sensitive nature—that is to say, a variation of one revolution in a hundred should be at least capable of effecting regulation. Therefore the contact at $v$ will be rapidly made and broken, and on account of the self-induction and inertia of the shunt-coils $a\ a$ the attractive energy of the field-magnet will not be raised and lowered to its maximum and minimum at each impulse; but when a load is thrown on the motor the device C will close the short circuit around the opposing coils c c for an appreciable time. The self-induction and inertia of the coils d d will then be overcome and the attractive energy of the field-magnet will increase until a point is reached where the effect of the attractive energy is balanced by the load. Similarly, when the load is reduced, the controlling device C will prevent the speed from increasing by throwing the coils c c into circuit. This so reduces the counter electro-motive force that the potential produced at the terminals of the armature will not be sufficient to sustain the current of the coils a a against the resistance of the shunt-circuit. Therefore the current of the shunt-coils a a will drop until the attractive energy is balanced by the load on the motor, and the speed of the latter will be kept constant, as described above. It should be understood, however, that I do not limit myself to the precise construction described. What I wish to claim is the regulation of the motor by varying the action of the series opposing coils or a part of them, and this can be done by any of the well-known means for varying the action of electro-magnetic coils. For instance, instead of the devices before described for closing a short circuit around the opposing coils, I may make use of resistances r, as shown in the diagram, Fig. 2, more or less resistance being automatically thrown in or cut out of the said short circuit around the opposing coils by the movement of the contact-arm L, as will be readily understood; nor do I wish to limit myself to any particular controlling devices so long as the force of such device varies with the speed of the armature.

I claim as my invention—

1. The combination of the armature of an electric motor with a field-magnet having shunt-coils and series coils opposed to each other, a short circuit around the series coils, and a speed-governor operating a contact for said short circuit to vary the magnetic effect of the field-magnet coils.

2. The combination of the armature of an electric motor with a field-magnet having shunt-coils and series coils opposed to each other, a short circuit around the series coils, a movable contact to open and close said short circuit, and a speed-governor driven by the armature to operate the said contact.

In testimony whereof I have signed my name to this specification in the presence of two subscribing witnesses.

DANIEL HIGHAM.

Witnesses:
 WILLIAM D. CONNER,
 HARRY SMITH.